(12) United States Patent
Lu et al.

(10) Patent No.: US 12,464,583 B2
(45) Date of Patent: Nov. 4, 2025

(54) MULTI-LINK DEVICE, COMMUNICATION METHOD, AND STORAGE MEDIUM

(71) Applicant: ZTE CORPORATION, Shenzhen (CN)

(72) Inventors: Liuming Lu, Shenzhen (CN); Liquan Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 376 days.

(21) Appl. No.: 18/042,871

(22) PCT Filed: Aug. 19, 2021

(86) PCT No.: PCT/CN2021/113567
§ 371 (c)(1),
(2) Date: Feb. 24, 2023

(87) PCT Pub. No.: WO2022/042426
PCT Pub. Date: Mar. 3, 2022

(65) Prior Publication Data
US 2023/0319922 A1 Oct. 5, 2023

(30) Foreign Application Priority Data
Aug. 31, 2020 (CN) .......................... 202010901358.7

(51) Int. Cl.
H04W 76/15 (2018.01)
(52) U.S. Cl.
CPC .................................. *H04W 76/15* (2018.02)

(58) Field of Classification Search
CPC ...... H04W 76/15; H04W 84/12; H04W 28/06
See application file for complete search history.

(56) References Cited

U.S. PATENT DOCUMENTS

| 2019/0335454 | A1* | 10/2019 | Huang | H04W 8/26 |
| 2020/0221545 | A1 | 7/2020 | Stacey et al. | |
| 2020/0359259 | A1* | 11/2020 | Patil | H04W 88/08 |
| 2023/0148056 | A1* | 5/2023 | Guo | H04L 43/12 370/252 |

FOREIGN PATENT DOCUMENTS

| CN | 106559903 A | 4/2017 |
| CN | 109672027 A | 4/2019 |
| CN | 110519862 A | 11/2019 |

(Continued)

OTHER PUBLICATIONS

International Search Report in Application No. PCT/CN2021/113567 dated Aug. 19, 2021, 4 pages, including translation.

(Continued)

*Primary Examiner* — Yaotang Wang
(74) *Attorney, Agent, or Firm* — Morgan, Lewis & Bockius LLP

(57) ABSTRACT

Provided are a multi-link device, a communication device, and a storage medium. The device includes: M stations, where the stations are non-access point (AP) stations, each station forms a respective communication link, the M stations form M communication links, and the M communication links communicate through P single wireless channels. M is greater than P, and P is greater than or equal to 1.

16 Claims, 11 Drawing Sheets

(56) References Cited

FOREIGN PATENT DOCUMENTS

| | | |
|---|---|---|
| CN | 110786069 A | 2/2020 |
| CN | 112512135 A | 3/2021 |

OTHER PUBLICATIONS

Extended European Search Report in Application No. 218602647, dated Oct. 15, 2024, 14 pages.
First Office Action in Chinese Application No. 202010901358.7 dated Nov. 19, 2024, 24 pages, including translation.
First Search Report in Chinese Application No. 202010901358.7 dated Nov. 18, 2024, 6 pages, including translation.

\* cited by examiner

Send an association request for establishing an association between the Non-AP MLD and the AP MLD during a multi-link operation establishment process, where the association request carries a capability related to a multi-link device supporting a single wireless channel operation, links sharing a single wireless channel, and/or operation parameters related to each link, the operation parameters include a communication mode, and the communication mode is a pre-configured mode or an automatic switching mode ~S910

The association response carrying acknowledging a single wireless channel by a capability related to a multi-link device, acknowledging a link of a single wireless channel, and acknowledging operation parameters related to each link ~S920

FIG. 9A

MULTI-LINK DEVICE, COMMUNICATION METHOD, AND STORAGE MEDIUM

CROSS REFERENCE TO RELATED APPLICATIONS

This is a National Stage Application filed under 35 U.S.C. 371, based on International Patent Application No. PCT/CN2021/113567, filed on Aug. 19, 2021, which claims priority to Chinese Patent Application No. 202010901358.7 filed with the China National Intellectual Property Administration (CNIPA) on Aug. 31, 2020, the disclosures of which are incorporated herein by reference in their entireties.

TECHNICAL FIELD

The present application relates to the technical field of communications and, for example, to a multi-link device, a communication method, and a storage medium.

BACKGROUND

In WIFI multi-link operation, simultaneous transmit and receive refers to simultaneous transmit and receive on two links of the same multi-link device (MLD). If the isolation between communication channels in the MLD is not well done, in-device coexistence interference is easily caused. An MLD device constrained by Non-STR (that is, not supporting simultaneous transmit and receive) should avoid the occurrence of simultaneous transmit and receive in multi-link operation.

SUMMARY

Embodiments of the present application provide a multi-link device, a communication method, and a storage medium to avoid coexistence interference.

In a first aspect, an embodiment of the present application provides a multi-link device including M stations. The stations are non-access point (AP) stations. Each of the stations forms a respective communication link. The M stations form M communication links. The M communication links communicate through P single wireless channels. M is greater than P, and P is greater than or equal to 1.

In a second aspect, an embodiment of the present application provides a multi-link device including M stations. The stations are access point (AP) stations. Each of the stations forms a respective communication link. The M stations form M communication links. The M communication links communicate through P single wireless channels. M is greater than P, and P is greater than or equal to 1.

In a third aspect, an embodiment of the present application provides a communication method. The method is applied by the multi-link device provided in the present application. The method includes sending an association request for establishing an association between a non-access point multi-link device (Non-AP MLD) and an access point multi-link device (AP MLD) during a multi-link operation establishment process; and receiving an association response sent from the AP MLD based on the association request, where the association response is configured to instruct the Non-AP MLD to establish an association with the AP MLD.

The association request carries at least one of the following: a capability related to a multi-link device supporting a single wireless channel operation, links sharing a single wireless channel, or operation parameters related to the multi-links. The related operation parameters include a communication mode. The communication mode is a pre-configured mode or an automatic switching mode.

The association response carries at least one of the following: configured to acknowledge a single wireless channel by a capability related to a multi-link device, configured to acknowledge a link of a single wireless channel, or configured to acknowledge operation parameters related to the multi-links.

In a fourth aspect, an embodiment of the present application provides a communication method. The method is applied by an access point multi-link device (AP MLD). The method includes receiving an association request for establishing an association between a non-access point multi-link device (Non-AP MLD) and the AP MLD; and sending, based on the association request, an association response to the Non-AP MLD, where the association response is configured to instruct the Non-AP MLD to establish an association with the AP MLD.

The association request carries at least one of the following: a capability related to a multi-link device supporting a single wireless channel operation, links sharing a single wireless channel, or operation parameters related to the multi-links. The related operation parameters include a communication mode. The communication mode is a pre-configured mode or an automatic switching mode.

The association response carries at least one of the following: configured to acknowledge a capability related to a multi-link device supporting a single wireless channel operation, configured to acknowledge links sharing a single wireless channel, or configured to acknowledge operation parameters related to the multi-links.

In a fifth aspect, an embodiment of the present application provides a device. The device includes a memory, a processor, a program stored on the memory and capable of operating on the processor, and a data bus configured to implement communication connection between the processor and the memory. When executed by the processor, the program implements the method described in the embodiments of the present application.

In a sixth aspect, an embodiment of the present application provides a computer-readable storage medium storing one or more programs. The one or more programs are executable by one or more processors to implement the method described in the embodiments of the present application.

BRIEF DESCRIPTION OF DRAWINGS

FIG. 9A is a flowchart of a communication method according to an embodiment of the present application.

DETAILED DESCRIPTION

Figure 1:
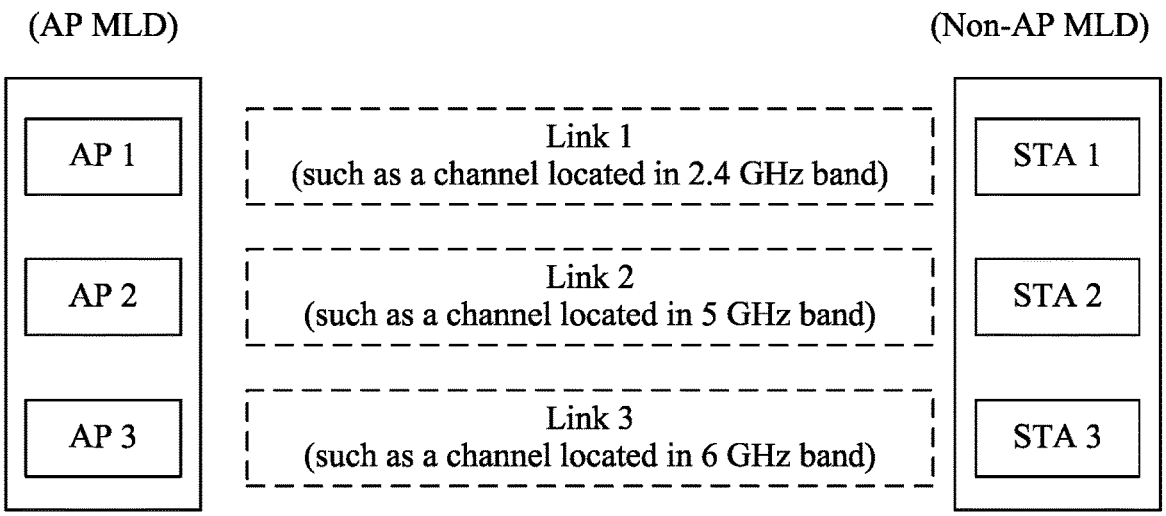
FIG. 1 is an architecture diagram of a multi-link communication system according to the related art.

The next generation WIFI standard (e.g. IEEE 802.11be) proposes a flexible multi-link operation and communications technology, the architecture of which is shown in FIG. 1. As shown in FIG. 1, a multi-link device has multiple attached stations (STAs). An MLD whose attached stations are access point (AP) stations is referred to as an AP multi-link device (AP MLD). An MLD whose attached stations are non-access point (Non-AP) stations is referred to as a non-access point multi-link device (Non-AP MLD). As shown in FIG. 1, non-AP stations in the Non-AP MLD may be associated with corresponding AP stations in the AP MLD in a one-to-one manner. Each link may have own corresponding communication channel. STA1, STA2, and STA3 are non-AP stations.

Figure 2:
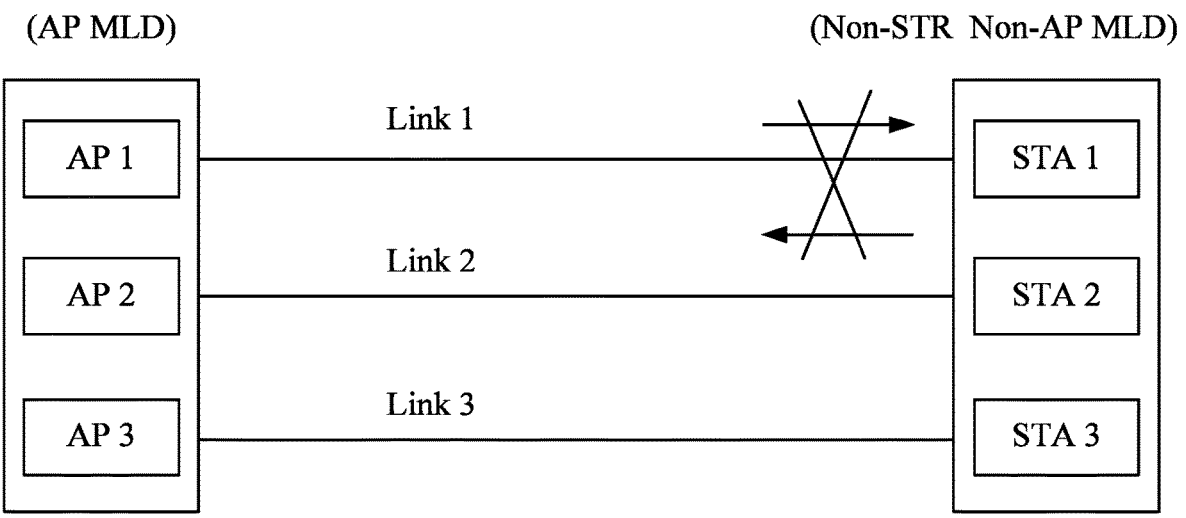
FIG. 2 is a diagram illustrating the communication restriction of a Non-STR MLD.

In WIFI multi-link operation, simultaneous transmit and receive (STR) refers to simultaneous transmit and receive on two or more communication links of the same MLD. If the isolation between communication channels in the MLD is not well done, in-device coexistence (IDC) interference is easily caused. Therefore, to avoid interference, some MLDs do not support simultaneous transmit and receive on two or more links (as shown in FIG. 2). Non-STR constraint refers to that an MLD device (that is, not supporting STR) should avoid the occurrence of STR in multi-link operation. Currently, there is a method in the related art to avoid the occurrence of STR by a request to send (RTS)/clear to send (CTS) mechanism, but there is a problem of low communication efficiency.

Figure 3:
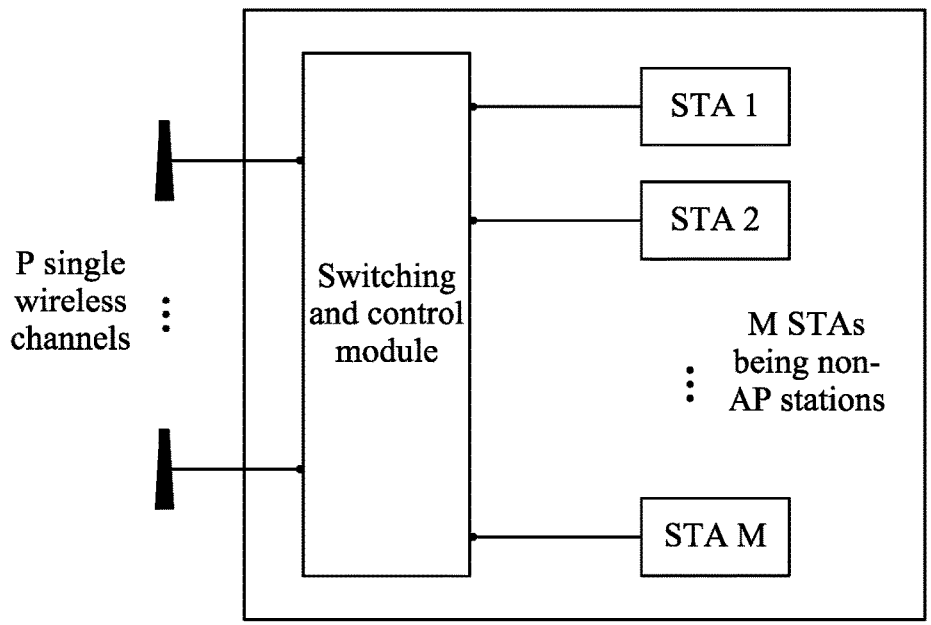
FIG. 3 is a diagram illustrating the structure of a multi-link device according to an embodiment of the present application.

FIG. 3 is a diagram illustrating the structure of a multi-link device according to an embodiment of the present application. As shown in FIG. 3, the multi-link device includes M stations. The stations are non-access point stations (Non-AP STAs). Each of the stations forms a respective communication link. The M stations form M communication links. The M communication links communicate through P single wireless channels. M is greater than P, and P is greater than or equal to 1. The device is a non-access point multi-link device (Non-AP MLD).

In an example embodiment, communication of at least two communication links is performed through one of the P single wireless channels. For a single wireless channel shared by multiple communication links, merely one of the communication links receives or sends data through the shared single wireless channel at each time.

In an example embodiment, M non-AP stations are associated with AP stations in an access point multi-link device (AP MLD), separately. At least two non-AP stations share one single wireless channel.

In an example embodiment, multiple non-AP stations sharing a single wireless channel in the multi-link device or multiple communication links sharing the single wireless channel in the multi-link device communicate with an AP MLD by using a pre-configured mode or an automatic switching mode.

In an example embodiment, at least two non-AP stations and communication links formed by AP stations in an AP MLD are switched and controlled to communicate through merely one single wireless channel at the same time.

Two or more stations (STAs) in M non-AP stations may be coordinated to share one of P single wireless channels by a switching and control module. A single wireless channel means that merely one channel can be worked on at the same time. For example, for one single wireless channel, channel 1 and channel 2 located in 2.4 GHz band and channel 3 located in 5 GHz band are supported, but merely one of the three channels is allowed to transmit and receive data at a certain moment.

In an example embodiment, non-AP stations are physical entities. The non-AP stations have independent physical channels and media access control implementation modules.

In an example embodiment, non-AP stations are logical entities. The non-AP stations and other non-AP stations share one physical channel and one media access control implementation module, which are processed separately in logical implementation.

A non-AP station may be a physical entity or a logical entity. The non-AP station has an independent physical channel (PHY) and a media access control (MAC) implementation module. The non-AP station may share one PHY and one MAC implementation module with other non-AP stations. However, the non-AP station and other non-AP stations are differentiated in logical implementation.

In an example embodiment, at least two non-AP stations share one single wireless channel, including at least two non-AP stations share one antenna.

In a Non-AP MLD device, a certain number of antennas are kept working, and some antennas are turned off so that M non-AP stations share P antennas (M>P, and P is the number of antennas that are working).

In an example embodiment, the M stations include two non-AP stations. The two non-AP stations share one single wireless channel. The two non-AP stations include a first non-AP station and a second non-AP station. The first non-AP station is associated with the first AP station in the AP MLD to form a first communication link. The second non-AP station is associated with the second AP station in the AP MLD to form a second communication link.

Figure 4:
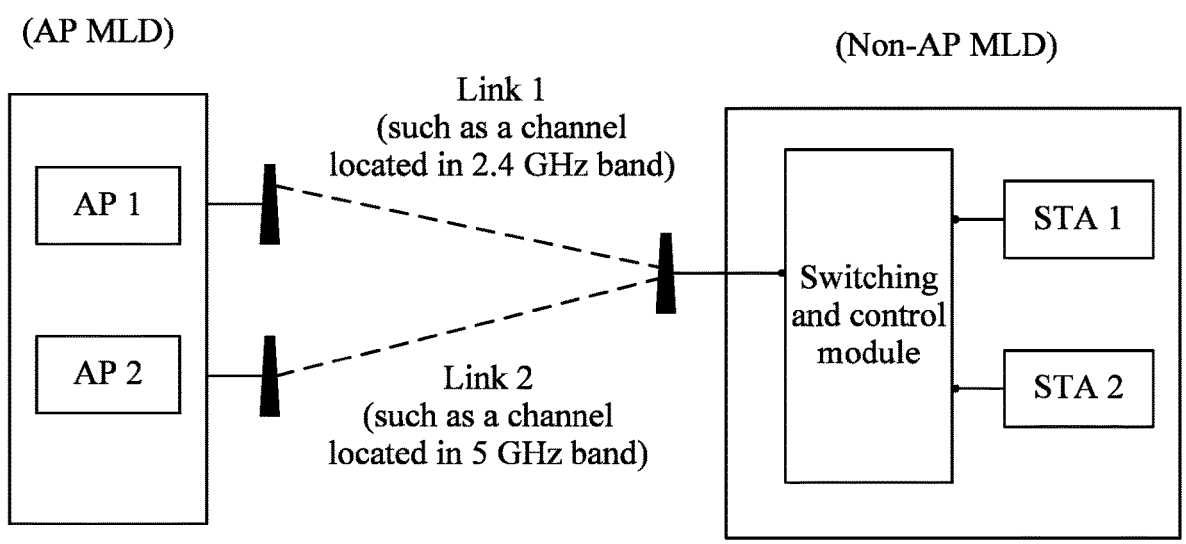
FIG. 4 is a diagram illustrating the communication of a multi-link device according to an embodiment of the present application.
Figure 5:
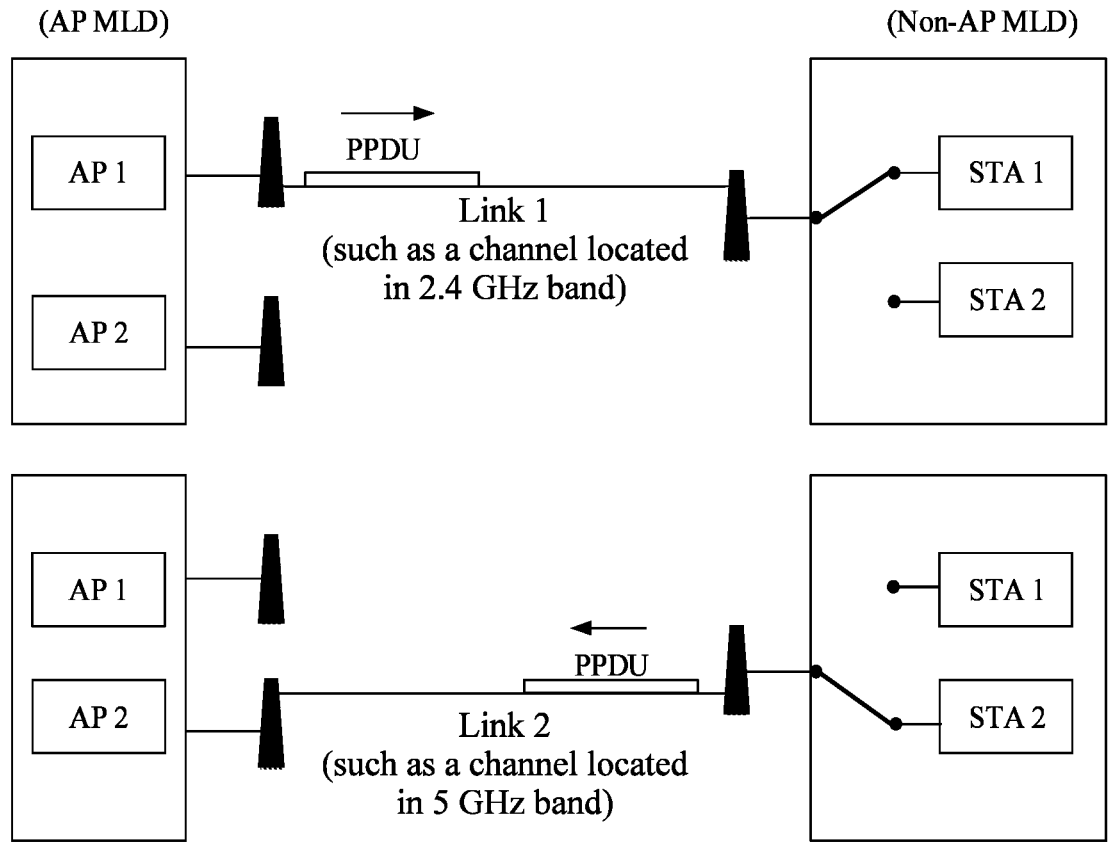
FIG. 5 is a diagram illustrating the communication of another multi-link device according to an embodiment of the present application.

For example, as shown in FIG. 4 and FIG. 5, STA1 and STA2 of a Non-AP MLD are associated with the AP1 station and the AP2 station of an AP MLD, respectively. That is, Link 1 and Link 2 are established, respectively. STA1 and STA2 share one antenna (that is, a single wireless channel). At any time, STA1 and STA2 can only simultaneously work on Link 1 or Link 2. At time T1, a wireless physical channel may perform data communication through Link 1 by using a communication channel corresponding to Link 1. At time T2, the wireless physical channel may perform data communication through Link 2 by using a communication channel corresponding to Link 2. STA1 and STA2 are non-AP stations.

In an example embodiment, a single wireless channel includes an antenna. The device has a first antenna and a second antenna. The first antenna is turned on, and the second antenna is turned off. Two non-AP stations share the first antenna for communication.

Figure 6:
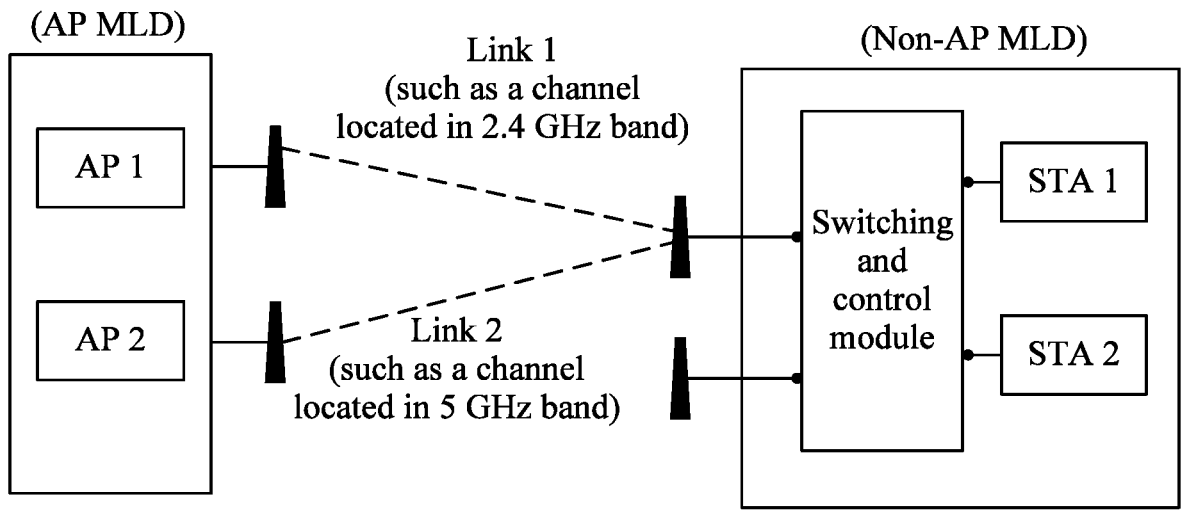
FIG. 6 is a diagram illustrating the communication of another multi-link device according to an embodiment of the present application.

For example, as shown in FIG. 6, the device has two antennas (that is, single wireless channels). However, in actual operation, one antenna is turned off, and merely one antenna works, that is, merely one single wireless channel works. STA1 and STA2 are associated with the AP1 station and AP2 station in the AP MLD, respectively. That is, Link 1 and Link 2 are established, respectively. STA1 and STA2 share one antenna, that is, STA1 and STA2 share one single wireless channel.

In an example embodiment, the device has one antenna. The two non-AP stations share the one antenna for communication.

In an example embodiment, M stations include four non-AP stations. The four non-AP stations include a first non-AP station, a second non-AP station, a third non-AP station, and a fourth non-AP station. The first non-AP station is associated with the first AP station in the AP MLD to form a first communication link. The second non-AP station is associated with the second AP station in the AP MLD to form a second communication link. The first non-AP station and the second non-AP station share a first single wireless communication channel. The third non-AP station is associated with the third AP station in the AP MLD to form a third communication link. The fourth non-AP station is associated with the fourth AP station in the AP MLD to form a fourth communication link. The third non-AP station and the fourth non-AP station share a second single wireless communication channel.

In an example embodiment, a single wireless channel includes an antenna. The Non-AP MLD has a first antenna and a second antenna. The first non-AP station and the second non-AP station share the first antenna for communication. The third non-AP station and the fourth non-AP station share the second antenna for communication.

Figure 7:
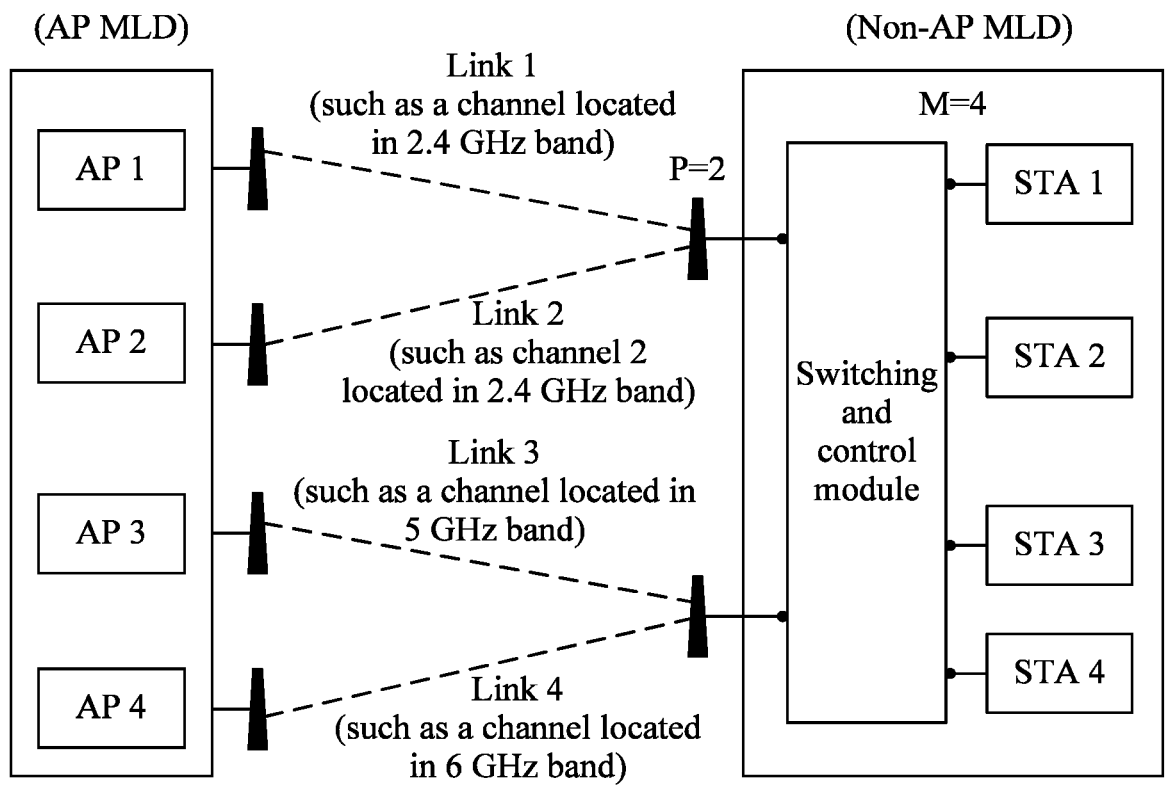
FIG. 7 is a diagram illustrating the communication of another multi-link device according to an embodiment of the present application.

For example, as shown in FIG. 7, a Non-AP MLD has two antennas, that is, two single wireless channels. STA1 and STA2 are associated with the AP1 station and AP2 station in an AP MLD, respectively. That is, Link 1 and Link 2 are established, respectively. STA1 and STA2 share one of the single wireless channels. STA3 and STA4 are associated with the AP3 station and AP4 station in the AP MLD, respectively. That is, Link 3 and Link 4 are established, respectively. STA3 and STA4 share another one of the single wireless channels.

According to the present application, the multi-link device provided includes M stations, and the stations are non-AP stations. Each station forms a respective communication link. The M stations form M communication links. The M communication links communicate through P single wireless channels. M is greater than P, and P is greater than or equal to 1. Thus, the occurrence of simultaneous transmit and receive can be avoided, coexistence interference can be avoided, and power consumption caused by simultaneous working can be reduced.

Figure 8:
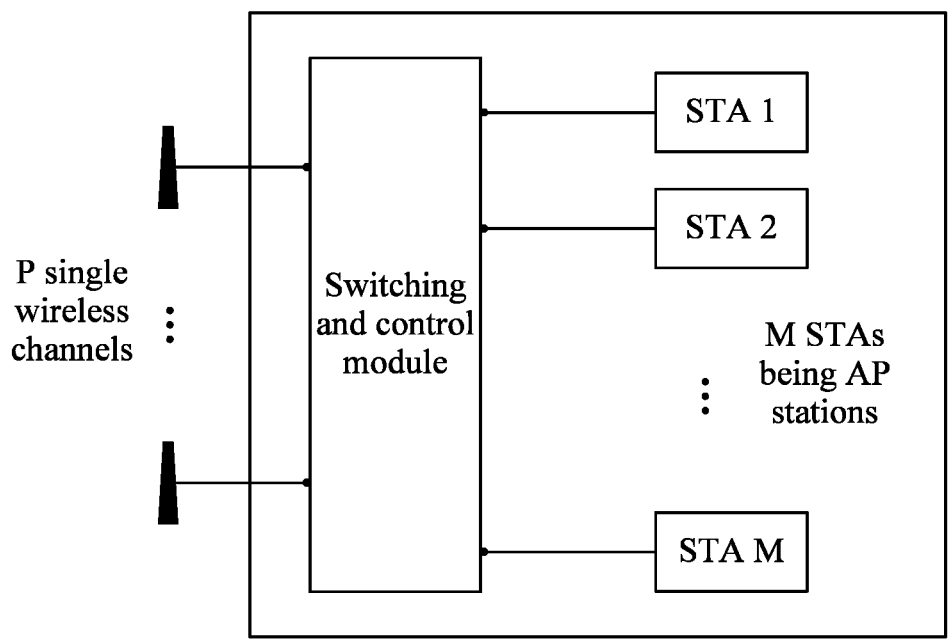
FIG. 8 is a diagram illustrating the structure of another multi-link device according to an embodiment of the present application.

FIG. 8 is a multi-link device provided in an embodiment of the present application. As shown in FIG. 8, the multi-link device includes M stations. The stations are access point (AP) stations. Each station forms a respective communication link. The M stations form M communication links. The M communication links communicate through P single wireless channels. M is greater than P, and P is greater than or equal to 1.

In an example embodiment, M AP stations are associated with non-AP stations in a non-access point multi-link device (Non-AP MLD), separately. At least two AP stations share one single wireless channel.

In an example embodiment, at least two of the AP stations are switched and controlled to share one single wireless channel with communication links formed by non-AP stations in the Non-AP MLD for communication. Merely one of the communication links receives or sends data through this single wireless channel at each time.

Two or more stations in M AP stations may be coordinated to share one of P single wireless channels by a switching and control module. A single wireless channel means that merely one channel can be worked on at the same time. For example, for one single wireless channel, channel 1 and channel 2 located in 2.4 GHz band and channel 3 located in 5 GHz band are supported, but merely one of the three channels is allowed to transmit and receive data at a certain time.

In an example embodiment, AP stations are physical entities, and the AP stations have independent physical channels and media access control implementation modules.

In an example embodiment, AP stations are logical entities. The AP stations and other AP stations share one physical channel and one media access control implementation module, which are processed separately in logical implementation.

In an example embodiment, at least two AP stations share one single wireless channel, including at least two AP stations share one antenna. In an AP MLD device, a certain number of antennas are kept working, and some antennas are turned off so that M AP stations share P antennas (M>P, and P is the number of antennas that are working).

According to the present application, the multi-link device provided includes M stations, and the stations are AP stations. Each station forms a respective communication link. The M stations form M communication links. The M communication links communicate through P single wireless channels. M is greater than P, and P is greater than or equal to 1. Thus, the occurrence of simultaneous transmit and receive can be avoided, coexistence interference can be avoided, and power consumption caused by simultaneous working can be reduced.

FIG. 9A is a flowchart of a communication method according to an embodiment of the present application. The method may be executed by a communication apparatus. The apparatus may be implemented by software and/or hardware and configured in the non-access point multi-link device (Non-AP MLD) provided in the embodiments of the present application. The method is applied in a scenario where a Non-AP MLD establishes an association with an AP MLD.

As shown in FIG. 9A, the technical solution provided in this embodiment of the present application includes the following steps.

In S910, an association request for establishing an association between the Non-AP MLD and the AP MLD is sent during a multi-link operation establishment process.

In S920, an association response sent from the AP MLD based on the association request is received. The association response is configured to instruct the Non-AP MLD to establish an association with the AP MLD.

The association request carries a capability related to a multi-link device supporting a single wireless channel operation, links sharing a single wireless channel, and/or operation parameters related to each link. The operation parameters include a communication mode. The communication mode is a pre-configured mode or an automatic switching mode. The association response carries acknowledging a single wireless channel by a capability related to a multi-link device, acknowledging a link of a single wireless channel, and acknowledging operation parameters related to each link.

Figure 9B:
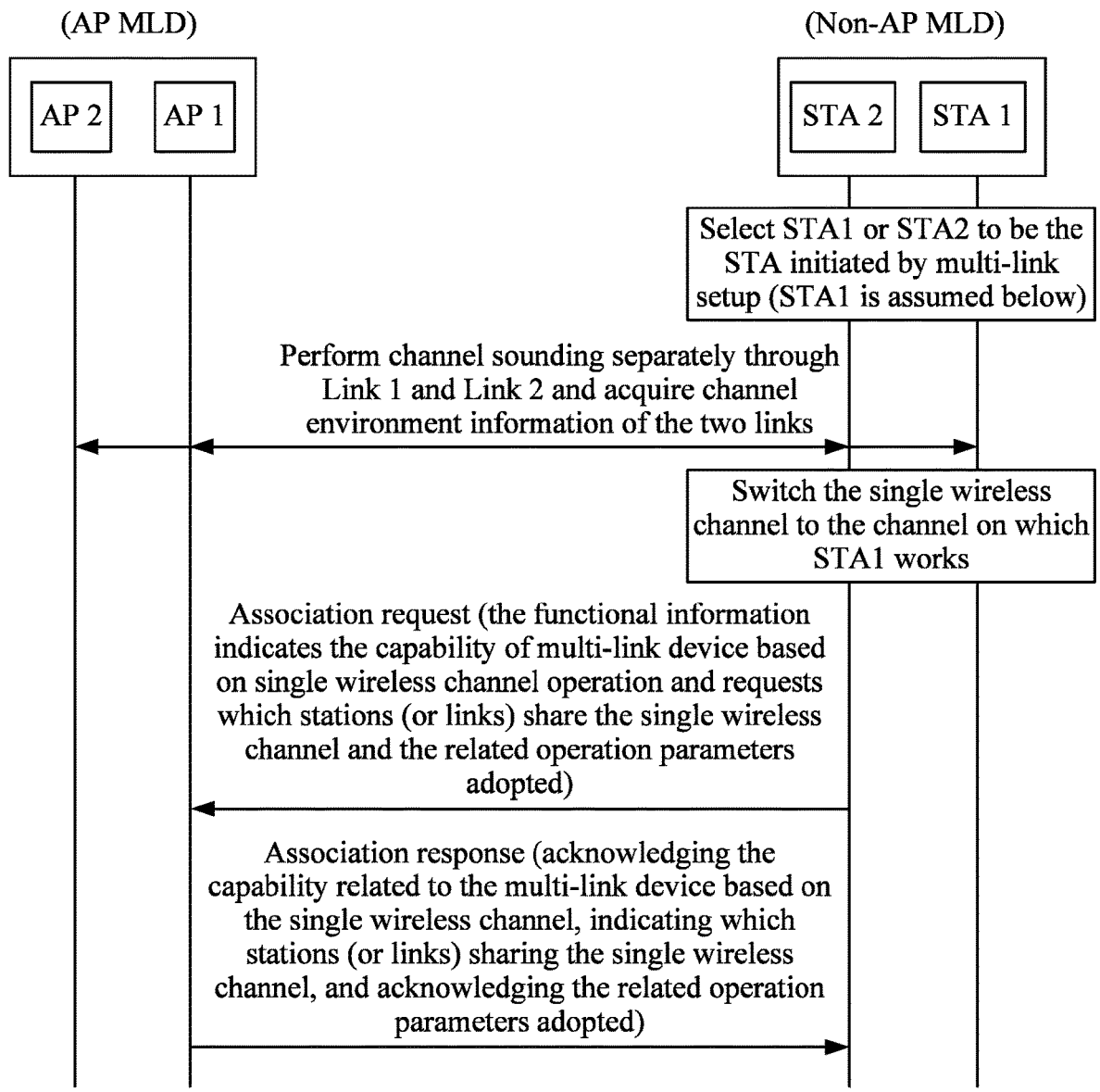
FIG. 9B is a diagram illustrating the link setup of a multi-link device based on a single wireless channel operation according to an embodiment of the present application.

In this embodiment, the Non-AP MLD and the AP MLD need to perform link setup and channel environment parameter update. The operation parameters may also include link switching parameters, communication channel parameters of links, and the like. For example, as shown in FIG. 9B, in the non-AP MLD multi-link setup stage based on the single wireless channel operation, through the coordinated switching of Link 1 and Link 2, channel sounding may be performed separately through Link 1 and Link 2. Channel environment information of the two links is acquired. STA1 or STA2 is selected to be the STA initiated by multi-link setup (STA1 may be assumed). The single wireless channel operation is switched to the wireless channel on which STA1 works.

The association request is initiated by STA1. The association request carries a capability related to a multi-link device supporting a single wireless channel operation, links sharing a single wireless channel, and/or operation parameters related to each link. The operation parameters include a communication mode and may also include communication channel parameters of links, link switching parameters, and the like. The AP MLD receives the association request and, after coordination processing, replies an association response to STA1 of the Non-AP MLD of the single wireless channel operation. The association response includes acknowledging the capability related to the multi-link device supporting the single wireless channel operation and the operation parameters of each link, acknowledging which stations (or links) share the single wireless channel operation, and the like.

In an example embodiment, in the case where the communication mode is a pre-configured mode, the method also includes receiving, through a first communication link, a configuration command of switching a communication link from the first communication link to another communication link; and sending, based on the configuration command, an acknowledgement message of switching to the another communication link.

In this embodiment, the Non-AP MLD establishes an association with the AP MLD. The first communication link may be an initial communication link. After the Non-AP MLD establishes an association with the AP MLD, the Non-AP MLD may communicate with the AP MLD through the first communication link (initial communication link). After the Non-AP MLD establishes an association with the AP MLD, the AP MLD, through the first communication link, sends a configuration command of switching a communication link from the first communication link to another communication link to the Non-AP MLD. The another communication link may be a link different from the first communication link and may be set according to requirements.

In this embodiment, after receiving the configuration command, the Non-AP MLD sends an acknowledgement message of switching to the another communication link and switches to the another communication link. After receiving the acknowledgement message, the AP MLD switches to the another communication link. The AP MLD communicates with the Non-AP MLD through the another communication link.

In an example embodiment, the method also includes sending, through the another communication link, a request of switching to a first target communication link, where the request of switching to the target communication link is configured to instruct the AP MLD to switch to the first target communication link; and communicating based on the first target communication link, where the first target communication link includes the first communication link or a communication link other than the first communication link and the another communication link.

In this embodiment, the Non-AP MLD may send the request of switching to the first target communication link and then switch to the first target communication link. The AP MLD receives the request to send acknowledgement message and then switches to the first target communication link. The Non-AP MLD communicates with the AP MLD through the first target communication link.

In an example embodiment, in the case where the communication mode is an automatic switching mode, the method also includes monitoring channel idle states of a first communication link and other communication lines which share a single wireless channel; and in the case where a channel corresponding to a second target communication link is monitored to be idle in a preset time period and data needs to be transmitted, transmitting the data through the second target communication link.

In this embodiment, the preset time period may be set according to actual requirements and may be T.

In this embodiment, if the channel is monitored to be busy all the time in the T duration, and no PPDU data or management control information is sent to itself (the target reception address is itself) in the T duration, another link is switched to monitor. If PPDU data or management control information sent to itself is monitored in the T duration, the PPDU data or management control information is received. After the data is received, another communication link is switched, or T duration is continued being monitored. In the case where uplink data needs to be transmitted in the T duration, when an idle channel is monitored, a transmit opportunity (TXOP) is acquired through a channel contention mechanism, and then uplink data transmission is performed.

Figure 10:
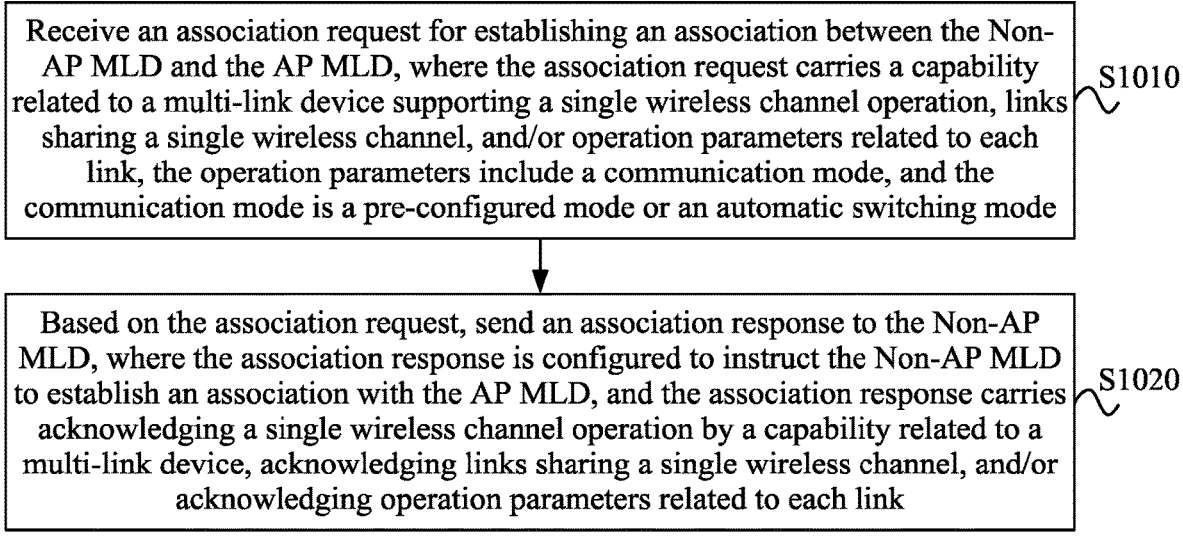
FIG. 10 is a flowchart of another communication method according to an embodiment of the present application.

FIG. 10 is a flowchart of a communication method according to an embodiment of the present application. The method may be executed by a communication apparatus. The apparatus may be implemented by software and/or hardware and configured in the access point multi-link device (AP MLD) provided in the embodiments of the present application. The method is applied in a scenario where a Non-AP MLD establishes an association with an AP MLD.

As shown in FIG. 10, the technical solution provided in this embodiment of the present application includes the following steps.

In S1010, an association request for establishing an association between the Non-AP MLD and the AP MLD is received.

In S1020, based on the association request, an association response is sent to the Non-AP MLD. The association response is configured to instruct the Non-AP MLD to establish an association with the AP MLD.

The association request carries a capability related to a multi-link device supporting a single wireless channel operation, links sharing a single wireless channel, and/or operation parameters related to each link. The operation parameters include a communication mode. The communication mode is a pre-configured mode or an automatic switching mode.

The association response carries acknowledging a single wireless channel operation by a capability related to a multi-link device, acknowledging links sharing a single wireless channel, and/or acknowledging operation parameters related to each link.

In this embodiment, the Non-AP MLD and the AP MLD need to perform link setup and channel environment parameter update. The operation parameters may also include link switching parameters, communication channel parameters of links, and the like. For example, as shown in FIG. 9B, in the non-AP MLD multi-link setup stage based on the single wireless channel operation, through the coordinated switching of Link 1 and Link 2, channel sounding may be performed separately through Link 1 and Link 2. Channel environment information of the two links is acquired. STA1 or STA2 is selected to be the STA initiated by multi-link setup (STA1 may be assumed). The single wireless channel operation is switched to the wireless channel on which STA1 works.

The association request is initiated by STA1. The association request carries a capability related to a multi-link device supporting a single wireless channel operation, links sharing a single wireless channel, and/or operation parameters related to each link. The operation parameters include a communication mode and may also include communication channel parameters of links, link switching parameters, and the like. The AP MLD receives the association request and, after coordination processing, replies an association response to STA1 of the Non-AP MLD of the single wireless channel operation. The association response includes acknowledging the capability related to the multi-link device supporting the single wireless channel operation and the operation parameters of each link, acknowledging which stations (or links) share the single wireless channel operation, and the like.

In an example embodiment, in the case where the communication mode is a pre-configured mode, the method also includes sending, through a first communication link, a configuration command of switching a communication link from the first communication link to another communication link to the Non-AP MLD; and receiving, through the first communication link, an acknowledgement message of switching to another communication link sent from the Non-AP MLD, and switching to the another communication link for communication.

In this embodiment, the Non-AP MLD establishes an association with the AP MLD. The first communication link may be an initial communication link. After the Non-AP MLD establishes an association with the AP MLD, the Non-AP MLD may communicate with the AP MLD through the first communication link (initial communication link). After the Non-AP MLD establishes an association with the AP MLD, the AP MLD, through the first communication link, sends a configuration command of switching a communication link from the first communication link to another communication link to the Non-AP MLD. The another communication link may be a link different from the first communication link and may be set according to requirements.

In this embodiment, after receiving the configuration command, the Non-AP MLD sends an acknowledgement message of switching to the another communication link and switches to the another communication link. After receiving the acknowledgement message, the AP MLD switches to the another communication link. The AP MLD communicates with the Non-AP MLD through the another communication link.

In an example embodiment, after switching to the another communication link for communication, the method further includes receiving, through the another communication link, a request of switching to a first target communication link sent from the Non-AP MLD; and switching to the first target communication link based on the request of switching to the first target communication link to communicate with the Non-AP MLD, where the first target communication link includes the first communication link or a communication link other than the first communication link and the another communication link.

In this embodiment, the Non-AP MLD may send the request of switching to the first target communication link and then switch to the first target communication link. The AP MLD receives the request to send acknowledgement message and then switches to the first target communication link. The Non-AP MLD communicates with the AP MLD through the first target communication link.

In an example embodiment, in the case where the communication mode is an automatic switching mode, the method further includes monitoring channel idle states of a first communication link and other communication lines which share a single wireless channel in the Non-AP MLD; in the case of monitoring a channel corresponding to a third target communication link being idle, sending a request to send control frame to the Non-AP MLD through the third target communication link, where the request to send control frame is configured to instruct the Non-AP MLD to receive data on the third target communication link; and receiving an acknowledgement message of the request to send control frame, and communicating based on the first target communication link.

Figure 11:
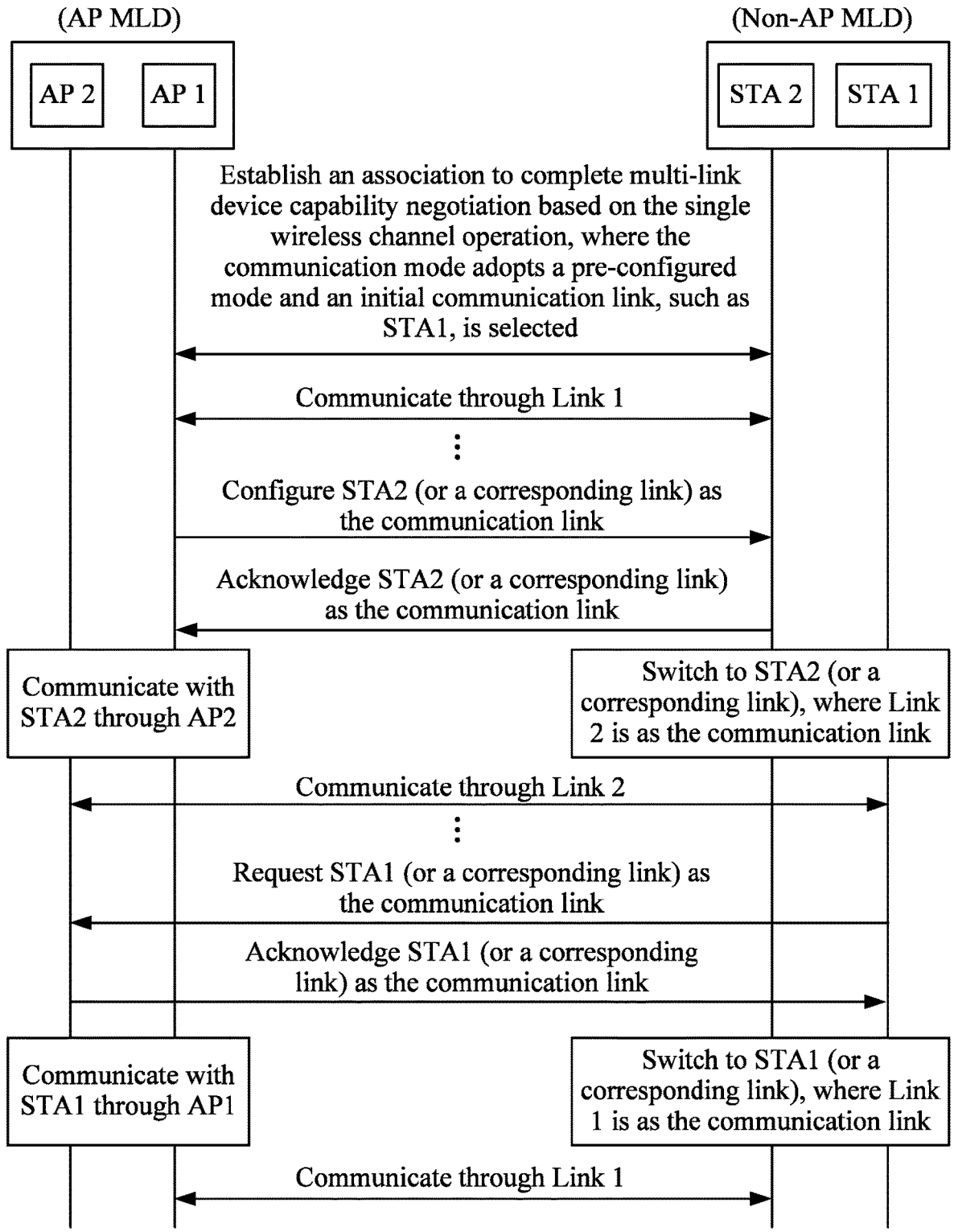
FIG. 11 is a flowchart illustrating the method of communication between a Non-AP MLD and an AP MLD in a pre-configured mode according to an embodiment of the present application.

In this embodiment of the present application, the method of communication between a Non-AP MLD and an AP MLD in a pre-configured mode may refer to FIG. 11. In this embodiment of the present application, an association is established between the Non-AP MLD and the AP MLD to complete multi-link device capability negotiation based on the single wireless channel operation. The flow of establishing an association between the Non-AP MLD and the AP MLD may refer to FIG. 9B. The communication mode adopts a pre-configured mode. An initial communication link, such as STA1, is selected. In the communication stage, the AP MLD sends a configuration command through Link 1 and configures STA2 (or a corresponding link) as the communication link. After receiving the configuration command, STA1 performs acknowledgement. Then, the Non-AP MLD switches to STA2 (or a corresponding link) and uses Link 2 as the communication link. Alternatively, in the communication stage, a request is initiated by a station, such as STA2, in which the Non-AP MLD is communicating, requesting to switch to Link 1 for data communication.

Communication is performed through Link 1 after the request is acknowledged by AP2 of the AP MLD.

In this embodiment, in the pre-configured mode, the Non-AP MLD and the AP MLD negotiate in advance to determine which communication link to use for communication. This includes selecting an initial communication link in the MLD setup process and switching to different communication links in the data communication stage by the AP MLD sending a configuration command to update the communication link, acknowledging by the Non-AP MLD or the Non-AP MLD requesting to update the manner of acknowledging the communication link by the AP MLD.

As shown in FIG. 11, an association is established between the Non-AP MLD and the AP MLD to complete multi-link device capability negotiation based on the single wireless channel operation. The communication mode adopts a pre-configured mode. An initial communication link, such as STA1, is selected. In the communication stage, the AP MLD sends a configuration command through Link 1 and configures STA2 (or a corresponding link) as the communication link. After receiving the configuration command, STA1 performs acknowledgement. Then, the Non-AP MLD switches to STA2 (or a corresponding link) and uses Link 2 as the communication link. Alternatively, in the communication stage, a request is initiated by a station, such as STA2, in which the Non-AP MLD is communicating, requesting to switch to Link 1 for data communication. Communication is performed through Link 1 after the request is acknowledged by AP2 of the AP MLD.

Figure 12A:
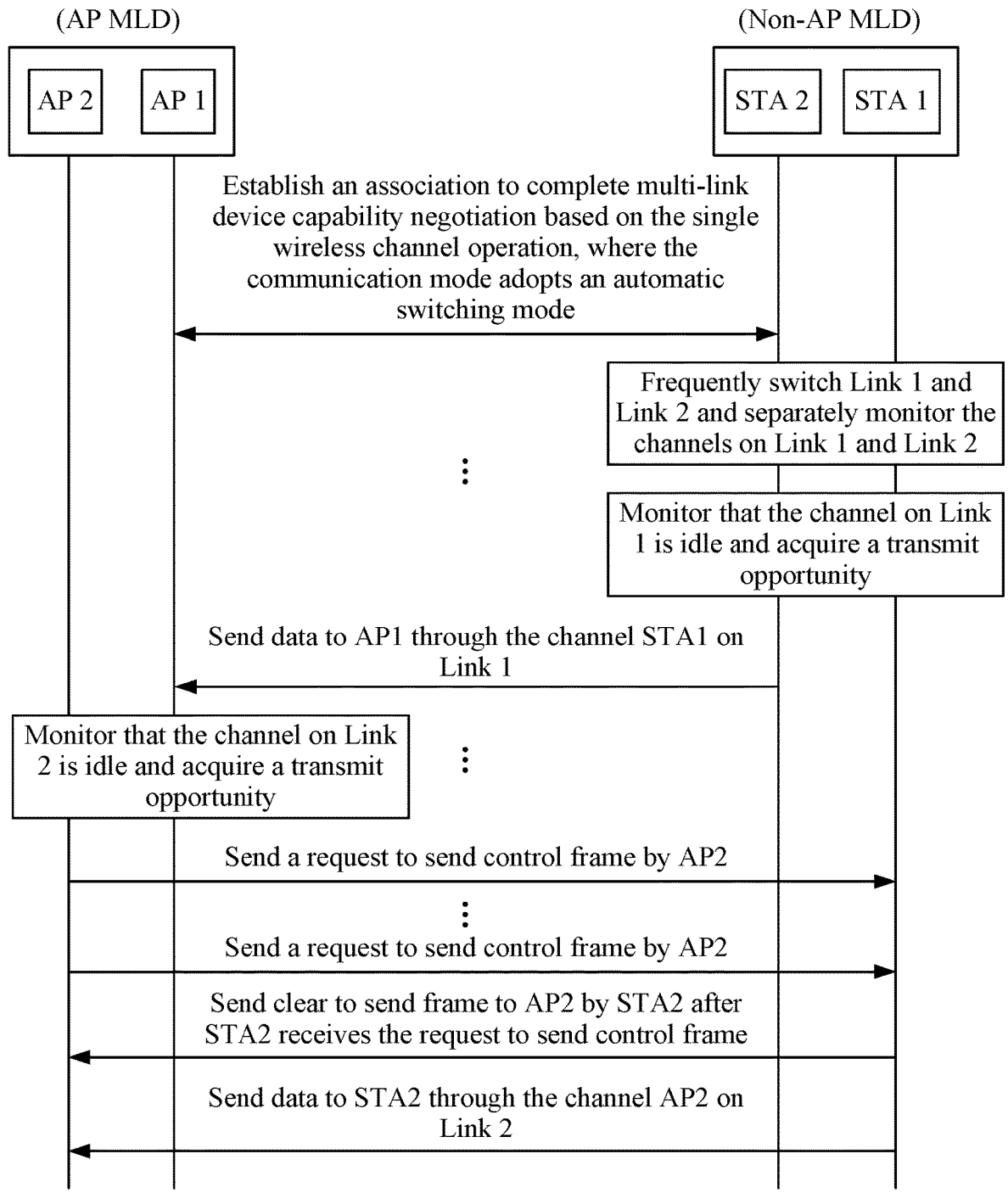
FIG. 12A is a flowchart illustrating the method of communication between a Non-AP MLD and an AP MLD in an automatic switching mode according to an embodiment of the present application.

In this embodiment of the present application, the method of communication between a Non-AP MLD and an AP MLD in an automatic switching mode may refer to FIG. 12A.

In this embodiment, an association is established between the Non-AP MLD and the AP MLD to complete multi-link device capability negotiation based on the single wireless channel operation, and the communication mode is determined to adopt an automatic switching mode. The flow of establishing an association between the Non-AP MLD and the AP MLD may refer to FIG. 9B. For two stations (STAs) that share a single wireless channel to operate and communication links corresponding to the two stations, the Non-AP MLD frequently switches Link 1 and Link 2 and separately monitors the channels on Link 1 and Link 2.

The specific method includes monitoring a certain link until T duration (where T indicates the duration length of monitoring a certain link). For a non-AP station (STA) of the Non-AP MLD, if the channel is monitored to be busy all the time in the T duration, and no physical-layer protocol data unit (PPDU) data or management control information is sent to itself (the target reception address is itself) in the T duration, another link is switched to monitor. If PPDU data or management control information sent to itself is monitored in the T duration, the PPDU data or management control information is received. After the data is received, another communication link is switched, or T duration is continued being monitored.

In the case where uplink data needs to be transmitted in the T duration, when an idle channel is monitored, a transmit opportunity (TXOP) is acquired through a channel contention mechanism, and then uplink data transmission is performed.

For the access points (APs) of the AP MLD, the two APs monitor corresponding communication channels. When an AP monitors an idle channel and acquires the transmit opportunity (TXOP), the AP sends a request to send control frame to the STA2. If the AP receives a reply (for example, a clear to send frame), the AP directly sends data. If no reply is received, the AP continues sending the request to send control frame. If no reply is received after the request to send control frame is sent N times, the data transmission is discarded.

Figure 12B:
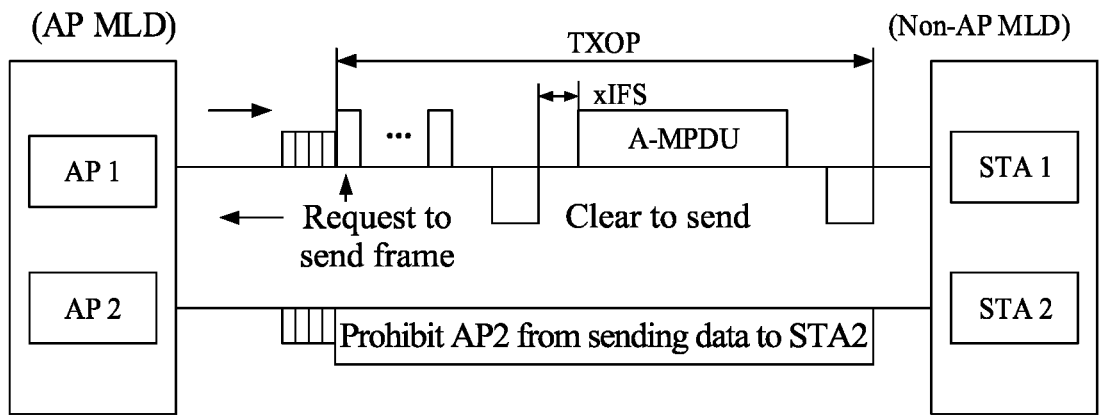
FIG. 12B is an example diagram of communication in an automatic switching mode according to an embodiment of the present application.

In the case where access points (APs), such as the AP1 station and AP2 station in FIG. 12B, communicating with corresponding stations in a multi-link device based on the single wireless channel operation are involved in the AP MLD, when the AP1 station sends data to STA1, the AP2 station is prohibited from sending data to STA2.

It is to be noted that the Non-AP MLD provided in the embodiments of the present application may be a multi-link device based on the single wireless channel operation.

Figure 13:
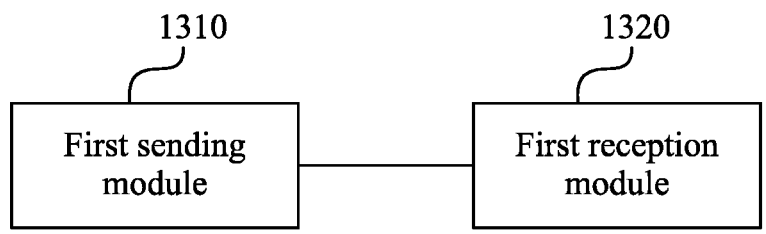
FIG. 13 is a block diagram illustrating the structure of a communication apparatus according to an embodiment of the present application.

FIG. 13 is a block diagram illustrating the structure of a communication apparatus according to an embodiment of the present application. The apparatus is configured in a Non-AP MLD. As shown in FIG. 13, the apparatus includes a first sending module 1310 and a first reception module 1320.

The first sending module 1310 is configured to send an association request for establishing an association between the Non-AP MLD and an AP MLD during a multi-link operation establishment process.

The first reception module 1320 is configured to receive an association response sent from the AP MLD based on the association request. The association response is configured to instruct the Non-AP MLD to establish an association with the AP MLD.

The association request carries a capability related to a multi-link device supporting a single wireless channel operation, links sharing a single wireless channel, and/or operation parameters related to each link. The operation parameters include a communication mode. The communication mode is a pre-configured mode or an automatic switching mode.

The association response carries acknowledging a single wireless channel by a capability related to a multi-link device, acknowledging a link of a single wireless channel, and acknowledging operation parameters related to each link.

In an example embodiment, in the case where the communication mode is a pre-configured mode, the first reception module 1320 is configured to receive, through a first communication link, a configuration command of switching a communication link from the first communication link to another communication link.

The first sending module 1310 is configured to send, based on the configuration command, an acknowledgement message of switching to the another communication link.

In an example embodiment, the first sending module 1310 is configured to send, through the another communication link, a request of switching to a first target communication link, where the request of switching to the target communication link is configured to instruct the AP MLD to switch to the first target communication link; and communicate based on the first target communication link, where the first target communication link includes the first communication link or a communication link other than the first communication link and the another communication link.

In an example embodiment, in the case where the communication mode is an automatic switching mode, a monitoring module is also included.

The monitoring module is configured to monitor channel idle states of a first communication link and other communication lines which share a single wireless channel; and in the case where a channel corresponding to a second target communication link is monitored to be idle in a preset time period and data needs to be transmitted, transmit the data through the second target communication link.

The preceding apparatus can execute the method provided in any embodiment of the present application and has functional modules and beneficial effects corresponding to the execution method.

Figure 14:
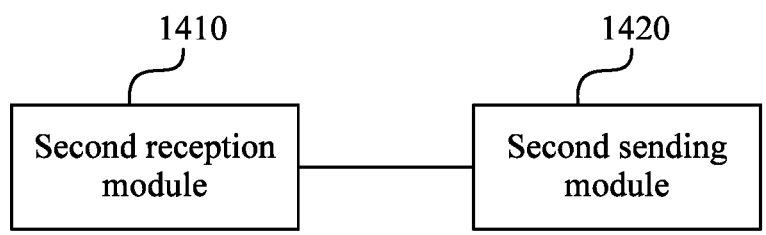
FIG. 14 is a block diagram illustrating the structure of another communication apparatus according to an embodiment of the present application.

FIG. 14 is a block diagram illustrating the structure of a communication apparatus according to an embodiment of the present application. The apparatus is applied to an AP MLD. As shown in FIG. 14, the apparatus includes a second reception module 1410 and a second sending module 1420.

The second reception module 1410 is configured to receive an association request for establishing an association between the Non-AP MLD and the AP MLD.

The second sending module 1420 is configured to send, based on the association request, an association response to the Non-AP MLD, where the association response is configured to instruct the Non-AP MLD to establish an association with the AP MLD.

The association request carries a capability related to a multi-link device supporting a single wireless channel operation, links sharing a single wireless channel, and/or operation parameters related to each link. The operation parameters include a communication mode. The communication mode is a pre-configured mode or an automatic switching mode.

The association response carries acknowledging a single wireless channel operation by a capability related to a multi-link device, acknowledging links sharing a single wireless channel, and/or acknowledging operation parameters related to each link.

In an example embodiment, in the case where the communication mode is a pre-configured mode, the second sending module 1420 is configured to send, through a first communication link, a configuration command of switching a communication link from the first communication link to another communication link to the Non-AP MLD.

The second reception module 1410 is configured to receive, through the first communication link, an acknowledgement message of switching to another communication link sent from the Non-AP MLD, and switch to the another communication link for communication.

In an example embodiment, after switching to the another communication link for communication, the second reception module 1410 is configured to receive, through the another communication link, a request of switching to a first target communication link sent from the Non-AP MLD.

A switching module is configured to switch to the first target communication link based on the request of switching to the first target communication link to communicate with the Non-AP MLD, where the first target communication link includes the first communication link or a communication link other than the first communication link and the another communication link.

In an example embodiment, in the case where the communication mode is an automatic switching mode, the apparatus also includes a monitoring module. The monitoring module is configured to monitor channel idle states of a first communication link and other communication lines which share a single wireless channel in the Non-AP MLD; in the case of monitoring a channel corresponding to a third target communication link being idle, send a request to send control frame to the Non-AP MLD through the third target communication link, where the request to send control frame is configured to instruct the Non-AP MLD to receive data on the third target communication link; and receive an acknowledgement message of the request to send control frame, and communicate based on the third target communication link.

In an example embodiment, the second sending module 1420 is configured to, in the case where the acknowledgement message sent from the Non-AP MLD is not received, continue sending the request to send control frame; and in the case where the request to send control frame is sent N times and the acknowledgement message is not received, discard to send data through the first communication link.

Figure 15:
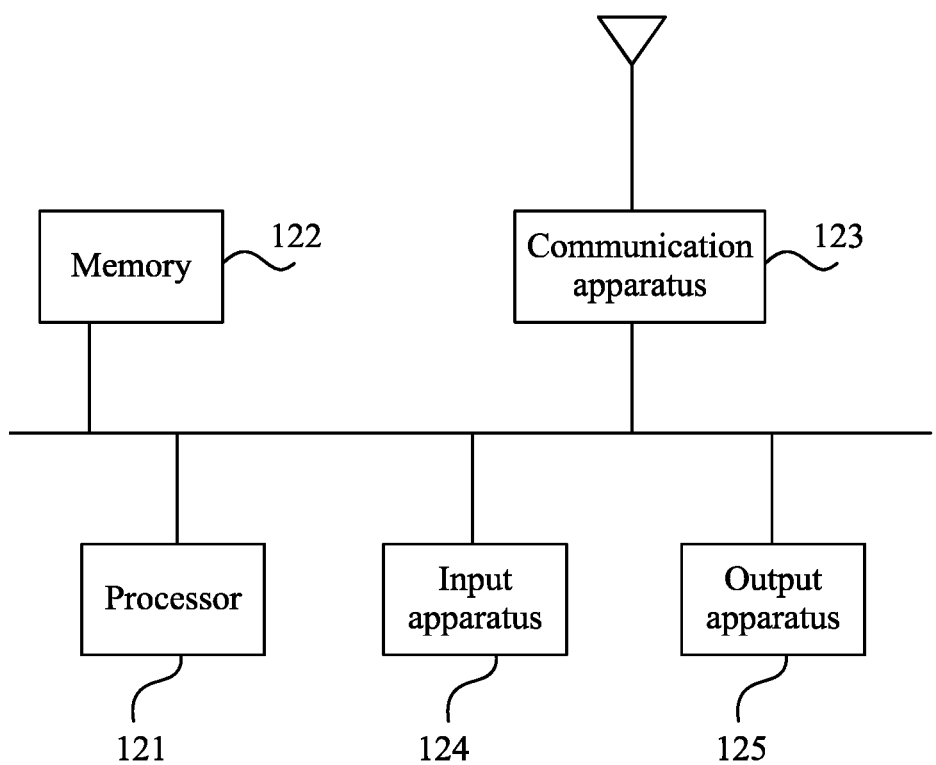
FIG. 15 is a diagram illustrating the structure of a device according to an embodiment of the present application.

An embodiment of the present application also provides a communication device. FIG. 15 is a diagram illustrating the structure of a device according to an embodiment of the present application. As shown in FIG. 15, the device provided in the present application includes one or more processors 121 and a memory 122. One or more processors 121 may be disposed in the device. In FIG. 15, one processor 121 is used as an example. The memory 122 is configured to store one or more programs. When executed by the one or more processors 121, the one or more programs cause the one or more processors 121 to implement the method described in the embodiments of the present application.

The device also includes a communication apparatus 123, an input apparatus 124, and an output apparatus 125.

The processor 121, the memory 122, the communication apparatus 123, the input apparatus 124, and the output apparatus 125 in the device may be connected through a bus or other manners, with connection through a bus as an example in FIG. 15.

The input apparatus 124 may be configured to receive inputted digital or character information and generate key signal input related to user settings and function control of the device. The output apparatus 125 may include display devices such as a display screen.

The communication apparatus 123 may include a receiver and a sender. The communication apparatus 123 is configured to perform information transceiving communication under the control of the processor 121.

As a computer-readable storage medium, the memory 122 may be configured to store software programs, computer-executable programs, and modules, such as program instructions/modules corresponding to the communication method described in the embodiments of the present application. The memory 122 may include a program storage region and a data storage region. The program storage region may store an operating system and an application program required by at least one function. The data storage region may store data created depending on the use of the device. Additionally, the memory 122 may include a high-speed random-access memory and may also include a nonvolatile memory such as at least one disk memory, a flash memory, or another nonvolatile solid-state memory. In some examples, the memory 122 may further include memories located remotely relative to the processor 121, and these remote memories may be connected to the device via a network. Examples of the preceding network include, but are not limited to, the Internet, an intranet, a local area network, a mobile communication network, and a combination thereof.

An embodiment of the present application provides a computer-readable storage medium. The computer-readable storage medium is configured to store one or more programs which may be executed by one or more processors to implement the following steps.

An association request for establishing an association between a Non-AP MLD and an AP MLD is sent during a multi-link operation establishment process.

An association response sent from the AP MLD based on the association request is received. The association response is configured to instruct the Non-AP MLD to establish an association with the AP MLD.

The association request carries a capability related to a multi-link device supporting a single wireless channel operation, links sharing a single wireless channel, and/or operation parameters related to each link. The operation parameters include a communication mode. The communication mode is a pre-configured mode or an automatic switching mode.

The association response carries acknowledging a single wireless channel by a capability related to a multi-link device, acknowledging a link of a single wireless channel, and acknowledging operation parameters related to each link. Alternatively, an association request for establishing an association between a Non-AP MLD and a AP MLD is received. Based on the association request, an association response is sent to the Non-AP MLD. The association response is configured to instruct the Non-AP MLD to establish an association with the AP MLD. The association request carries a capability related to a multi-link device supporting a single wireless channel operation, links sharing a single wireless channel, and/or operation parameters related to each link. The operation parameters include a communication mode. The communication mode is a pre-configured mode or an automatic switching mode. The association response carries acknowledging a single wireless channel operation by a capability related to a multi-link device, acknowledging links sharing a single wireless channel, and/or acknowledging operation parameters related to each link.

It is to be understood by those having ordinary skill in the art that some or all steps of the preceding method and function modules/units in the preceding system or device may be implemented as software, firmware, hardware, and suitable combinations thereof.

In the hardware implementation, the division of the preceding function modules/units may not correspond to the division of physical components. For example, one physical component may have multiple functions, or one function or step may be executed jointly by several physical components. Some or all physical components may be implemented as software executed by a processor such as a central processing unit, a digital signal processor, or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules, or other data). The computer storage media include, but are not limited to, a RAM, a ROM, an EEPROM, a flash memory or other memory technologies, a CD-ROM, a digital video disc (DVD) or other optical storages, a magnetic cassette, a magnetic tape, a magnetic disk or other magnetic storage apparatuses, or any other medium that can be used for storing desired information and that can be accessed by a computer. Additionally, as is known to those having ordinary skill in the art, the communication media generally include computer-readable instructions, data structures, program modules or other data in carriers or in modulated data signals transported in other transport mechanisms and may include any information delivery medium.

What is claimed is:

1. A multi-link device, comprising M stations, wherein the stations are non-access point (AP) stations, each of the stations forms a respective communication link, the M stations form M communication links, and the M communication links communicate through P single wireless channels, wherein M is greater than P, and P is greater than or equal to 1;
   wherein at least two of the non-AP stations are switched and controlled to share one single wireless channel with communication links formed by AP stations in an access point multi-link device (AP MLD) for communication, and one of the communication links receives or sends data through the shared single wireless channel at each time.

2. The device of claim 1, wherein communication of at least two of the M communication links is performed through one of the P single wireless channels, and for a single wireless channel shared by a plurality of communication links, one of the plurality of communication links receives or sends data through the single wireless channel shared by the plurality of communication links at each time.

3. The device of claim 1, wherein the M non-AP stations are associated with the AP stations in the AP MLD, separately, wherein at least two of the M non-AP stations share the one single wireless channel.

4. The device of claim 3, wherein the at least two of the M non-AP stations sharing the one single wireless channel comprises: the at least two of the M non-AP stations sharing one antenna.

5. The device of claim 1, wherein a plurality of non-AP stations sharing a single wireless channel in the multi-link device or a plurality of communication links sharing the single wireless channel in the multi-link device communicate with the AP MLD by using a pre-configured mode or an automatic switching mode.

6. The device of claim 1, wherein the M stations comprise two non-AP stations, the two non-AP stations share the one single wireless channel, and the two non-AP stations comprise a first non-AP station and a second non-AP station, wherein
   the first non-AP station is associated with a first AP station in the AP MLD to form a first communication link, and
   the second non-AP station is associated with a second AP station in the AP MLD to form a second communication link.

7. The device of claim 6, wherein the single wireless channel comprises an antenna, and the device has a first antenna and a second antenna, wherein the first antenna is turned on, and the second antenna is turned off; and
   the two non-AP stations share the first antenna for communication.

8. The device of claim 1, wherein the M stations comprise four non-AP stations, and the four non-AP stations comprise a first non-AP station, a second non-AP station, a third non-AP station, and a fourth non-AP station,
   wherein the first non-AP station is associated with a first AP station in the AP MLD to form a first communication link, and the second non-AP station is associated with a second AP station in the AP MLD to form a second communication link, wherein the first non-AP station and the second non-AP station share a first single wireless communication channel; and the third non-AP station is associated with a third AP station in the AP MLD to form a third communication link, and the fourth non-AP station is associated with a fourth AP station in the AP MLD to form a fourth communication link, wherein the third non-AP station and the fourth non-AP station share a second single wireless communication channel.

9. A communication method, the method applied by the multi-link device of claim 1 and comprising:
sending an association request for establishing an association between a non-access point multi-link device (Non-AP MLD) and the AP MLD during a multi-link operation establishment process; and
receiving an association response sent from the AP MLD based on the association request, wherein the association response is configured to instruct the Non-AP MLD to establish an association with the AP MLD;
the association request carries at least one of the following: a capability of the multi-link device supporting an operation of a single wireless channel, links sharing a single wireless channel, or operation parameters related to each link in the multi-links, wherein the related operation parameters comprise a communication mode, and the communication mode is a pre-configured mode or an automatic switching mode; and
the association response carries at least one of the following: acknowledgement of the capability of the multi-link device of the single wireless channel, acknowledgement of a link of the single wireless channel, or acknowledgement of the operation parameters related to each link in the multi-links.

10. The method of claim 9, wherein in a case where the communication mode is the pre-configured mode, the method further comprises:
receiving, through a first communication link, a configuration command of switching a communication link from the first communication link to another communication link; and
sending, based on the configuration command, an acknowledgement message of switching to the another communication link.

11. The method of claim 10, further comprising:
sending, through the another communication link, a request of switching to a target communication link, wherein the request of switching to the target communication link is configured to instruct the AP MLD to switch to a first target communication link; and
communicating based on the first target communication link, wherein the first target communication link comprises the first communication link or a communication link other than the first communication link and the another communication link.

12. The method of claim 9, wherein in a case where the communication mode is the automatic switching mode, the method further comprises:
monitoring channel idle states of a first communication link and other communication links which share the single wireless channel; and
in a case where a channel corresponding to a second target communication link is monitored to be idle in a preset time period and data needs to be transmitted, transmitting the data through the second target communication link.

13. A non-transitory computer-readable storage medium storing one or more programs, wherein the one or more programs are executable by one or more processors to implement the method of claim 9.

14. A multi-link device, comprising M stations, wherein the stations are access point (AP) stations, each of the stations forms a respective communication link, the M stations form M communication links, and the M communication links communicate through P single wireless channels, wherein M is greater than P, and P is greater than or equal to 1;
wherein at least two of the AP stations are switched and controlled to share one single wireless channel with communication links formed by non-AP stations in a non-access point multi-link device (Non-AP MLD) for communication, and one of the communication links receives or sends data through the shared single wireless channel at each time.

15. The device of claim 14, wherein the M AP stations are separately associated with the non-AP stations in the Non-AP MLD, wherein at least two of the M AP stations share the one single wireless channel.

16. The device of claim 14, wherein an access point multi-link device (AP MLD) communicates with the Non-AP MLD by using a pre-configured mode or an automatic switching mode.

* * * * *